(12) United States Patent
Lorin et al.

(10) Patent No.: US 9,176,567 B2
(45) Date of Patent: Nov. 3, 2015

(54) PROCEDURE FOR CHARGING A PORTABLE DEVICE USING A BATTERY-OPERATED COMPUTER

(71) Applicants: STMicroelectronics Design and Application S.R.O., Prague (CZ); STMicroelectronics (Grenoble 2) SAS, Grenoble (FR)

(72) Inventors: Christophe Lorin, Montbonnot (FR); Benedicte Micheau, Bresson (FR); Roman Prochazka, Prague (CZ); Vaclav Jelen, Praha 2 (CZ); Ondrej Plachy, Kladno (CZ)

(73) Assignees: STMicroelectronics Design and Application S.R.O., Prague (CZ); STMicroelectronics (Grenoble 2) SAS, Grenoble (FR)

( * ) Notice: Subject to any disclaimer, the term of this patent is extended or adjusted under 35 U.S.C. 154(b) by 267 days.

(21) Appl. No.: 13/904,866

(22) Filed: May 29, 2013

(65) Prior Publication Data
US 2013/0326254 A1 Dec. 5, 2013

(30) Foreign Application Priority Data
Jun. 1, 2012 (FR) ...................................... 12 01578

(51) Int. Cl.
| G06F 1/00 | (2006.01) |
|---|---|
| G06F 1/26 | (2006.01) |
| H02J 7/00 | (2006.01) |
| H02J 7/04 | (2006.01) |
| G06F 3/00 | (2006.01) |
| G06F 1/32 | (2006.01) |

(52) U.S. Cl.
CPC .............. *G06F 1/3234* (2013.01); *G06F 1/266* (2013.01); *G06F 1/3215* (2013.01); *H02J 7/007* (2013.01); *H02J 7/0047* (2013.01); *H02J 7/0054* (2013.01); *G06F 1/3203* (2013.01); *G06F 1/3246* (2013.01); *H02J 2007/0049* (2013.01); *H02J 2007/0062* (2013.01)

(58) Field of Classification Search
None
See application file for complete search history.

(56) References Cited

U.S. PATENT DOCUMENTS

| 2006/0129700 | A1* | 6/2006 | Bopardikar ..................... 710/2 |
|---|---|---|---|
| 2008/0094036 | A1* | 4/2008 | Yamashita et al. ............ 320/162 |
| 2009/0200982 | A1 | 8/2009 | Hurtz |
| 2010/0180132 | A1* | 7/2010 | Wu et al. ........................ 713/300 |
| 2011/0161694 | A1 | 6/2011 | Fujiwara |
| 2011/0187314 | A1* | 8/2011 | Kim ............................... 320/107 |
| 2013/0162198 | A1* | 6/2013 | Yokota et al. .................. 320/107 |
| 2014/0340050 | A1* | 11/2014 | Wakatabe et al. ............. 320/152 |

FOREIGN PATENT DOCUMENTS

| EP | 2 388 885 A2 | 11/2011 |
|---|---|---|
| WO | 2010/099483 A2 | 9/2010 |

* cited by examiner

*Primary Examiner* — Ji H Bae
(74) *Attorney, Agent, or Firm* — Seed IP Law Group PLLC

(57) ABSTRACT

A method of charging a battery of a device using a battery of a computer powered by the battery, in which the procedure is implemented by a circuit independent of the computer's processors. The method includes supplying a power supply voltage, insufficient to charge a battery, to a computer port, as long as a device is detected as connected to the port, controlling the supply of a charging voltage to the port, while supplying charging voltage to the port, detecting an end of charging condition of a battery of the device, and controlling the cutting off of the charging voltage to the port if the end of charging condition is detected, where this condition is determined according to the intensity of a charging current and according to a quantity of electrical charge supplied to the port and/or of a charging period.

13 Claims, 3 Drawing Sheets

PROCEDURE FOR CHARGING A PORTABLE DEVICE USING A BATTERY-OPERATED COMPUTER

BACKGROUND

1. Technical Field

This disclosure relates to devices used for charging portable devices.

2. Description of the Related Art

A large variety of portable devices has recently appeared on the market, such as laptop computers, notepads, mobile telephones, personal digital assistants, music and video players, cameras and video cameras. The common features of these devices are that they can all be battery-operated and have compatible connection interfaces allowing them to be connected to a computer, laptop or other, especially for exchanging data. The most commonly used connection interfaces are USB (Universal Serial Bus) and IEEE 1394 ("Firewire").

A proposal has therefore been made to charge the batteries of these small portable devices through these connection interfaces with the device connected to a computer. This charging method is possible even with a laptop computer not connected to a charger, in other words, operating on its battery, since the latter is significantly larger than that of a device like a mobile telephone.

In some laptop computer configurations, the connection interface feeds power supply and/or charging voltage to a connected device, regardless of the power status of the laptop computer, and especially even if it is not switched on. In other laptop computer configurations, especially in the case of notepads or so-called "ultraportable" computers, the connection interface is set to a low power mode in which it only supplies low power supply voltage without enabling any charging of a device, or only charging of devices powered by very small batteries. In both of these configurations, an interface control circuit may or may not have detected the presence of a connected device. The connected device decides autonomously to stop the charging process, but does not usually provide the charger with any information concerning this status change. Only devices operating an energy management protocol can supply this information, and this information is only used if the computer supplying the charging voltage is not in standby mode.

BRIEF SUMMARY

A method of charging a battery of a portable device using a computer in which the procedure is implemented by a specific logic circuit independent of the computer's processors, may comprise steps of: powering the computer with a battery and putting the computer into sleep mode, supplying a power supply voltage, insufficient to charge a battery, to a computer port, detecting whether a device is connected to the computer port, as long as a device is detected as connected to the port, controlling the supply of a charging voltage to the port, while supplying the charging voltage to the port, detecting an end of charging condition of a battery of the device, and controlling the cutting off of the supply of charging voltage to the port if the end of charging condition is detected, where the end of charging condition is determined according to the intensity of a charging current and according to a quantity of electrical charge supplied to the port and/or of a charging period.

According to an embodiment, the end of charging condition is considered to occur when one of the following conditions is apparent: the intensity of the charging current supplied to the port is lower than a threshold value, the electrical charge supplied to the port is higher than a threshold value, and the charging period for the battery of the device exceeds a maximum charging period.

According to an embodiment, the detection of a device connected to port comprises the detection of a current intensity drop on a line supplying the power supply voltage to the port.

According to an embodiment, the detection of a device connected to the port comprises preliminary discharging steps of capacitors connected to the port, charging these capacitors, monitoring the end of charging of these capacitors, and if the end of charging of these capacitors is not detected at the end of a fixed time of several seconds, a device is considered already connected to the port and the current supplied to the port is limited to an intensity of between 0.4 and 0.6 mA.

According to an embodiment, the method comprises, if a device is considered already to be connected to port, waiting for the intensity of the current supplied to the port to be lower than a threshold value, indicating that the device has been disconnected from the port, and verifying that the intensity of the current supplied to the port remains lower than the threshold value at the end of a certain time.

According to an embodiment, the method comprises powering the logic circuit with the power supply voltage.

According to an embodiment, the power supply voltage is supplied to certain circuits of a computer, put into sleep mode in State G3 or G2-S5 as specified in standard ACPI.

According to an embodiment, the charging voltage is between 4.5 V and 5.5 V, providing a power of between 15 and 30 VA, and the power supply voltage is between 1.8 V and 5.5 V, providing a power between 0.05 and 0.5 VA.

Embodiments relate to a device for controlling the power supply of a port of a computer supplied by a battery and comprising a power supply in sleep mode, the device being configured to implement the method as previously defined when the computer is powered in a sleep mode.

According to an embodiment, the device comprises: a circuit for detecting a device connected to the port of the computer, a circuit for comparing the intensity of the current supplied to the port to a current threshold value corresponding to the intensity of a current at an end of charging of the battery and sending an end of charging signal, a counting circuit triggered on starting to charge a battery connected to the port, by the receipt of a signal reporting detection of a device connected to the port, sent by the detection circuit, and sending an end of counting signal when an end of charging condition is detected, and a logic circuit sending a cutting off signal of the charging current as a function of the detection, end of charging and end of counting signals.

According to an embodiment, the counting circuit is configured to send the end of counting signal when a maximum charging period has elapsed since the start of the battery charging or when a certain quantity of electrical charge has been supplied to the port.

According to an embodiment, the detection circuit includes a finite-state machine supplying the detection signal, and controlling a bypass switch for supplying the power supply voltage to the port, a discharge switch for controlling the discharging of the capacitors connected to the port, a current limiter inserted on a link supplying the power supply voltage to the port, the state machine receiving a signal representative of the presence of a voltage drop on the link supplying the power supply voltage, a signal reporting that the current limited by the current limiter has been exceeded, and a signal representative of the presence of a charging voltage.

At least some embodiments also relate to a computer comprising a power supply battery and a device as discussed herein.

A method may comprise: putting a computer into a sleep mode, the computer having a battery, one or more processors, a port, and charge-control circuitry; in response to an indication of an external device being coupled to the port, controlling, by the charge-control circuitry, supply of a charging voltage to the port during the sleep mode, the controlling including detecting an end of charging condition of the external device based on an indication of an intensity of a charging current and a counting signal. The end of charging condition may be considered detected in response to any of: an indication that the intensity of the charging current is lower than a first threshold value; an indication that an amount of electrical charge supplied to the port is higher than a second threshold value; and an indication that a charging period has exceeded a threshold charging period. The method may comprise generating the indication of a device connected to the port in response to detection of a current intensity drop on a line supplying power to the port. The method may comprise: discharging one or more capacitors coupled to the port; charging the one or more capacitors; monitoring charging of the one or more capacitors; and in response to expiration of a threshold capacitor-charge time period before the monitoring indicates the one or more capacitors are charged, limiting an intensity of a current provided to the port. The method may comprise: waiting for the intensity of the current provided to the port to drop below a threshold value; and verifying that the intensity of the current provided to the port remains lower than the threshold value for a threshold verification time period. The method may comprise powering the charge-control circuitry with a power supply voltage. The method may comprise providing the power supply voltage to one or more circuits of the computer in a sleep mode in State G3 or G2-S5 of an Advanced Configuration and Power (ACPI) standard. The method may comprise providing a power supply voltage to the port, wherein the charging voltage is between 4.5 V and 5.5 V, providing a power of between 15 and 30 VA, and the power supply voltage is between 1.8 V and 5.5 V, providing a power between 0.05 and 0.5 VA.

A device may comprise: an input configured to couple to a supply voltage line; detection circuitry configured to couple to a port and to generate a detection signal indicating an external device is coupled to the port; and sleep-mode charge-control circuitry configured to generate a sleep-mode charge-control signal based on an indication of an intensity of a charging current of a charging voltage line and a counting signal. The sleep-mode charge-control circuitry may comprise: a comparator configured to compare the intensity of the charging current to a current threshold value corresponding to an expected intensity of a charging current at an end of a charging cycle and to generate the indication of the intensity of the charging current; a counter configured to generate an indication a charging time has elapsed; and a logic circuit configured to generate the charge-control signal based on the detection signal, the indication of the intensity of the charging current and the indication the charging time has elapsed. The counter may be configured to indicate the charging time has elapsed when a threshold charging period has elapsed or a threshold quantity of electrical charge has been supplied to the port. The detection circuitry may include: a finite-state machine configured to supply the detection signal; a bypass switch configured to couple the supply voltage line to the port; a discharge switch configured to control discharging of capacitors coupled to the port; and a current limiter inserted on a link coupling the supply voltage line to the port. The state machine may be configured to receive a signal representative of a voltage drop on the link coupling the supply voltage line to the port, a signal indicating a current limit of the current limiter has been exceeded, and a signal indicating a charging voltage is present.

A system may comprise: one or more processors; a port; power supply circuitry configured to generate a supply voltage and a charging voltage; a port-charging control device configured to control charging of external devices in a system sleep mode. The port-charging control device may include: detection circuitry configured to couple to the port and to generate a detection signal indicating an external device is coupled to the port; and charge-control circuitry configured to generate a charge-control signal based on an indication of an intensity of a charging current of a charging voltage line and a counting signal. The charge-control circuitry may comprise: a comparator configured to compare the intensity of the charging current to a current threshold value corresponding to an expected intensity of a current at an end of a charging cycle and to generate the indication of the intensity of the charging current; a counter configured to generate an indication a charging time has elapsed; and a logic circuit configured to generate the charge-control signal based on the detection signal, the indication of the intensity of the charging current and the indication the charging time has elapsed. The counter may be configured to indicate the charging time has elapsed when a threshold charging period has elapsed or a threshold quantity of electrical charge has been supplied to the port. The detection circuitry may include: a finite-state machine configured to supply the detection signal; a bypass switch configured to couple a supply voltage line to the port; a discharge switch configured to control discharging of capacitors coupled to the port; and a current limiter inserted on a link coupling the supply voltage line to the port, wherein the state machine is configured to receive a signal representative of a voltage drop on the link coupling the supply voltage line to the port, a signal indicating a current limit of the current limiter has been exceeded, and a signal indicating a charging voltage is present.

A system may comprise: means for coupling to a supply voltage line; means for generating a detection signal indicating an external device is coupled to a system port; and means for controlling charging of the external device based on an intensity of a charging current of a charging voltage line and a counting signal. The means for controlling may comprise: a comparator configured to compare the intensity of the charging current to a current threshold value corresponding to an expected intensity of a current at an end of a charging cycle and to generate an indication of the intensity of the charging current; a counter configured to generate an indication a charging time has elapsed; and a logic circuit configured to generate a charge-control signal based on the detection signal, the indication of the intensity of the charging current and the indication the charging time has elapsed. The counter may be configured to indicate the charging time has elapsed when a threshold charging period has elapsed or a threshold quantity of electrical charge has been supplied to the port. The means for generating the detection signal may include: a finite-state machine configured to supply the detection signal; a bypass switch configured to couple the supply voltage line to the port; a discharge switch configured to control discharging of capacitors coupled to the port; and a current limiter inserted on a link coupling the supply voltage line to the port, wherein the state machine is configured to receive a signal representative of a voltage drop on the link coupling the supply voltage line to the port, a signal indicating a current limit of the current limiter has been exceeded, and a signal indicating a charging voltage is present. The system may further comprise: one or more memories; and one or more processors.

BRIEF DESCRIPTION OF THE SEVERAL VIEWS OF THE DRAWINGS

Examples, not restrictive, of realization of embodiments will be described below with reference to the attached figures, of which.

DETAILED DESCRIPTION

In the following, example embodiments of a power management unit and method will be explained in more detail. It should be understood, however, that the drawings and detailed description thereto are not intended to limit the disclosure to the particular form disclosed, but, on the contrary, the disclosure is to cover all modifications, equivalents and alternatives falling within the spirit and scope of the present disclosure.

In the following description, numerous specific details are given to provide a thorough understanding of embodiments. The embodiments can be practiced without one or more of the specific details, or with other methods, components, materials, etc. In other instances, well-known structures, materials, or operations, such as, for example, connectors, batteries, capacitors, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In reality, the USB standard specifications do not define the conditions in which charging of a connected portable device should be stopped, or the protective measures that should be taken with regard to the computer.

In these conditions, the absence of any detection of the end of charging of the external battery means that the computer sometimes unnecessarily remains in the high power supply mode and leakage currents consequently discharge the computer battery although no external battery remains on charge.

The inventors have recognized that, once charging of the connected device battery is finished, the computer should cut off the high power voltage supply from the computer generally needed to charge a battery connected to the connection interface. This way, the computer battery would not discharge unnecessarily.

Some computer manufacturers have made provision to have the battery charging status of the connected portable device monitored by the computer's main processor. The computer must therefore be started up for this process, hence in high power supply mode, even if no external battery is to be charged, and this adversely affects the computer's autonomy when it is powered by a battery and not being used.

Figure 1:
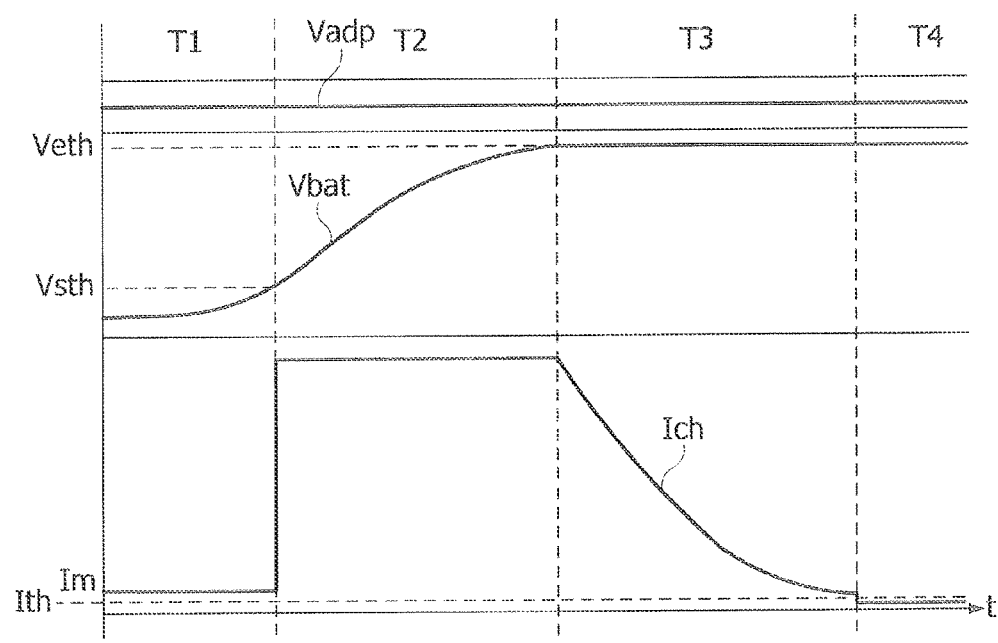
FIG. 1, shows timing diagrams of variations of current intensity and voltage values observed during battery charging.

Moreover, monitoring battery charging and detecting the end of this charging give rise to problems. These problems are illustrated in FIG. 1, which shows voltage and current intensity timing diagrams illustrating the charging of a portable device battery. FIG. 1 shows voltage Vadp supplied by the charger, which is constant, the variations of voltage Vbat at the battery terminals and the variations of charging current Ich. Current Ich defines four phases T1 to T4, namely a pre-charging phase T1 during which current Ich remains constant at a low value Im, a constant current charging phase T2 triggered when voltage Vbat reaches a certain value Vsth starting from a minimum value, a constant current charging phase T3 starting when voltage Vbat reaches a maximum full charging value Veth and an end of charging phase T4 reached when the charging current drops below a threshold value Ith. During phase T2, current Ich remains substantially constant at a maximum value. During phase T3, current Ich reduces progressively to a value close to value Im at the start of phase T1, then drops below the value of threshold Ith. FIG. 1 shows that the values of currents Im and Ith can be very close. This means that the end of battery charging is difficult to detect and requires a highly sensitive detector. Furthermore, the current drop that triggers phase T4 does not appear in some devices, due to the fact that the device continues to consume current, meaning that it is impossible to detect the end of battery charging.

In the special and frequent case of lithium ion polymer batteries, period T2 may last about one and a half hours, and may allow the battery to be charged to approximately 70%. The duration of period T3 for reaching a full battery charge may be approximately the same. Full charging of this type of battery may therefore typically be achieved in three hours regardless of the battery capacity. However, the current intensity ratio during phase T2 between a battery of a simple audio player and that of a "smartphone" telephone can reach 50. The same current intensity ratio can be observed at the end of charging. The result is that a ratio of 2500 can be observed between the highest and lowest current intensity values. Comparing the charging current or supplied quantity of electrical charge to a threshold value is not therefore a very reliable way of detecting the end of battery charging.

Moreover, the charging current of an external battery can be weaker than the leakage currents in the computer. This means that the current measurement at the port to which the battery to be charged is connected is distorted by the presence of these leakage currents. The leakage currents in the laptop computer can also sometimes be found to be greater than those in the connected device at the end of battery charging.

It may therefore be desirable to ensure that charging voltage to a battery of a device connected to a connection interface of a battery-powered computer is cut off at the end of charging of the device battery. It may also be desirable to enable charging of an external battery even when the computer is switched off, in other words, when the high power voltage is cut off. It may also be desirable not to trigger charging of an external device on connecting it to the computer interface when the battery of the external device is already fully charged. It may also be desirable to limit the current consumption of devices connected to the computer interface with no battery charging required. It may also be desirable to perform these functions without any substantial computer modification, using a circuit having a reduced number of components and a low power consumption.

Figure 2:
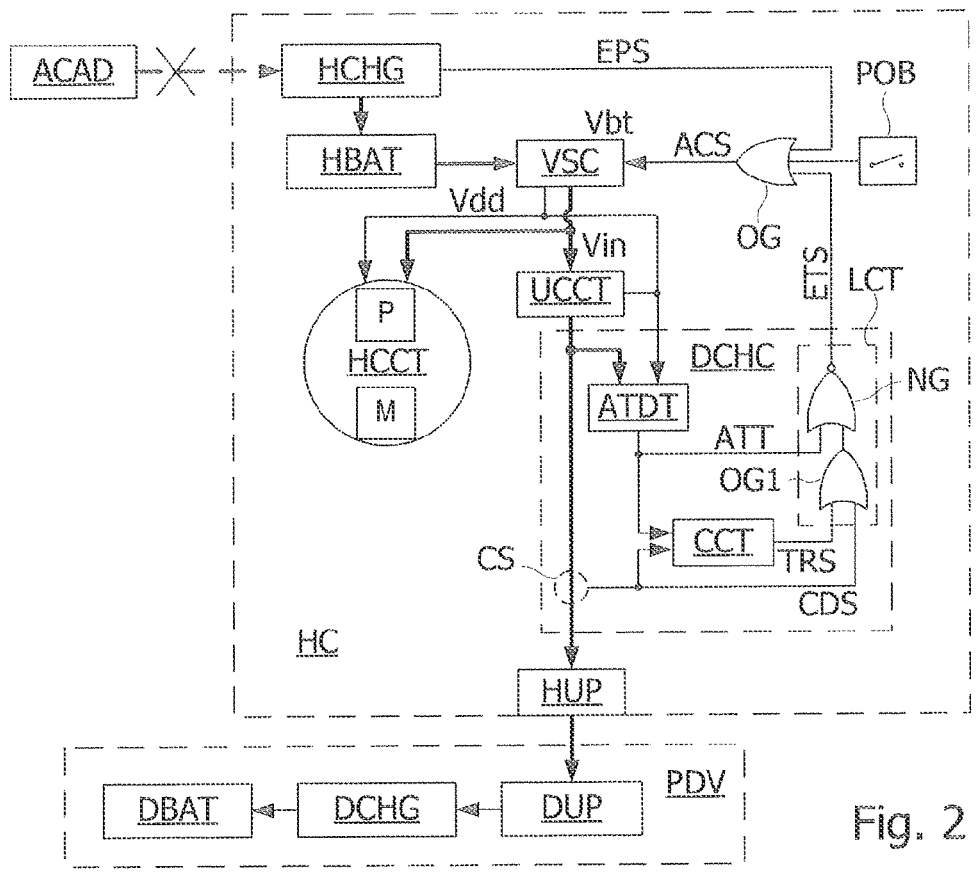
FIG. 2 shows a diagram of a computer including a power supply battery and a connection interface connected to a portable device according to an embodiment.

FIG. 2 shows a laptop computer HC, battery-operated and connected to a portable device PDV such as a mobile telephone or an audio or video player. Computer HC includes a power supply circuit VSC, a battery charging circuit HCHG capable of being connected on one side to an alternating current to direct current converter ACAD and on the other to a battery HBAT supplying a power supply voltage Vbt to circuit VSC. Circuit VSC supplies the different circuits or components HCCT of computer HC, including in particular processors P (e.g., main and graphics), memories M, a hard disk, etc. Circuit VSC also supplies a control circuit for interface connection UCCT connected to a connection port HUP for connecting external devices to computer HC. An OR logic gate marked OG supplies an activation signal ACS to circuit VSC. The input of gate OG receives an activation signal from an ON/OFF push button POB of computer HC, and a signal reporting that an external power supply voltage EPS supplied by charging circuit HCHG is present. More precisely, circuit VSC supplies the abovementioned circuits with a voltage Vin, which may be of the order of 5 V (between 4.5 V and 5.5 V), high power (between 15 and 30 VA), and a voltage Vdd, which can be of the order of 3 V (between 1.8 V and 5.5 V), low power of the order of 0.1 VA (between 0.05 and 0.5 VA). Some or all of the circuits may receive voltage Vdd, without receiving voltage Vin, in certain power supply modes of computer HC. These circuits are then in sleep mode.

In the configuration illustrated in FIG. 2, computer HC is not connected to converter ACAD, which is connected to an external electrical power supply source (not illustrated). When signal ACS is active, power supply circuit VCS is activated to supply the different circuits HCCT and UCCT of computer HC with voltage Vin.

Port HUP of computer HC is connected to a port DUP of portable device PDV. Device PDV includes in particular a battery charging circuit DCHG receiving a charging voltage from port DUP and a battery DBAT connected to charging circuit DCHG. Port HUP can include one or several data transmission lines and one or several direct current transmission lines providing a power supply to a device connected to port HUP. Port HUP and circuit UCCT may thus conform to, for example, USB standard 2.0 or 3.0, or to standard IEEE 1394.

According to one embodiment of a method, computer HC also includes a charging control circuit DCHC of a device connected to port HUP. Circuit DCHC includes a current comparator CS inserted between control circuit UCCT and port HUP, a counting circuit CCT, a detection circuit ATDT for detecting a device connected to port DUP, and a logic circuit LCT connected to outputs of circuits ATDT, CS and CCT. Comparator CS compares the current supplied by circuit UCCT to port HUP with a current threshold (for example threshold Ith of FIG. 1) corresponding to an end of charging current, and sends a detection signal CDS to circuit LCT and to an initializing input of circuit CCT. The end of charging current threshold may be set, for example, at a value between 1 and 5 mA, for example fixed at 2.5 mA. Circuit ATDT receives voltages Vdd from circuit VSC and power supply voltage Vin from circuit UCCT. Circuit ATDT sends a detection signal ATT to circuit LCT and to an input of circuit CCT to trigger counting. Circuit CCT sends an end of counting signal EOC to circuit LCT. The end of charging is reached or assumed reached at the end of counting. Circuit LCT sends an activation signal ETS to gate OG. Circuit LCT is configured such that signal ETS is active if the following three conditions are met simultaneously:

a device is detected as connected to port HUP, the current supplied to port HUP is greater than the end of charging current, and the end of counting has not been reached.

In the other cases, signal ETS is inactive. Voltage Vin is then cut off if the ON contact POB is open and if the computer is only powered by battery HBAT (EPS signal inactive).

In the example of FIG. 2, circuit LCT includes an OR-type logic gate OG1 that receives signals CDS and EOC, and a NOR-type logic gate NG that receives the output signal from gate OG1 and signal ATT, and sends activation signal ETS. Signal CDS is then active when comparator CS detects a current lower than the current threshold (end of charging detection). Signal EOC is inactive as long as circuit CCT is active, namely in the process of counting, and switches to active mode at the end of counting when a threshold value is reached. Signal ATT is inactive as long as a device is connected to port HUP and active if no device is connected to port HUP.

This way, power supply circuit VSC can be active for a period defined by circuit CCT following the connection of an external device to port HUP, if computer HC is operating on its battery HBAT and if the user has not switched the computer on (by operating push button POB).

Counting circuit CCT can be a Coulomb counter for counting an electrical charge corresponding to the current supplied to the device connected to port HUP. Circuit CCT can also be a simple time counter that emits an end of counting signal at the end of a timed period. The timed period may be fixed, for example, at a duration longer than an expected maximum charging time for devices likely to charged at a port such as port HUP. The timed period for circuit CCT may, for example, be fixed at a value chosen in an interval ranging from 2 to 4 hours, fixed for example at 3 hours. Circuit CCT can also combine a Coulomb counter with a time counter, knowing that a battery likely to be connected to port HUP can generally be fully charged in about 3 hours. The Coulomb counter then enables battery charging to be stopped if the latter is detected as charged before the end of the timed period of the time counter.

It may be noted that activation and deactivation of circuit VSC are not performed by a processor of computer HC and that they do not call upon such a processor to monitor charging of the external device. On the contrary, the circuits used to perform these operations are simple (current comparator with a threshold, counter, logic gate, detector of the presence of a device connected to port HUP), and may have low power consumption, thereby preserving battery HBAT and hence the autonomy of computer HC.

Signal ATT reporting detection of a device connected to port HUP and sent by circuit ATDT can be developed from the detection of a voltage drop resulting from the connection of a device to port HUP. To that effect, circuit ATDT can receive low power voltage Vdd and detect such a voltage drop from this voltage value. Signal ATT can also be developed from the detected closing or opening of an electrical contact mechanically operated by the connection of a device to port HUP. In these particular cases, signal ATT may be sent not by circuit ATDT but by port HUP itself.

Circuit ATDT can be configured to be supplied exclusively with voltage Vdd, and hence to function within the variation window of voltage Vdd, ranging from 1.8 V to 5.5 V, at the same time having a reduced power consumption in the aim of discharging battery HBAT as little as possible when computer HC is only powered by the latter. Traditional methods of monitoring current consumption through connected devices or of monitoring current surges through the device's internal capacitors are not generally operable below 4 V. Circuit ATDT may also be configured to prevent multiple consecutive charging cycles of the device connected to port HUP. Circuit ATDT may also be configured to limit the current drawn by external devices, especially those without batteries requiring charging.

Figure 3:
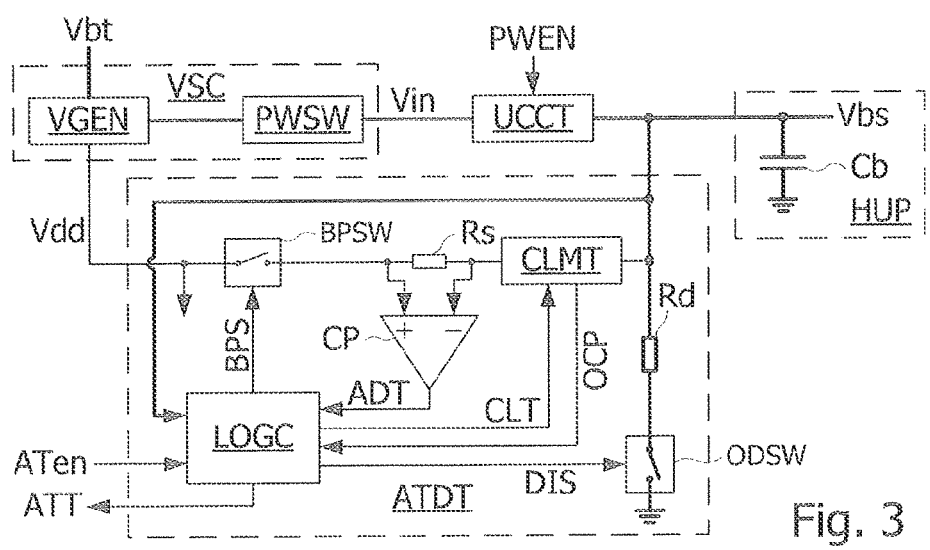
FIG. 3 shows a diagram of a detection circuit of a device connected to the computer according to an embodiment.

FIG. 3 illustrates an embodiment of a circuit ATDT. FIG. 3 also illustrates circuit VSC and port HUP. Circuit VSC includes a voltage generator VGEN and a high-power switch PWSW. Generator VGEN produces voltages Vdd and Vin from voltage Vbt supplied by battery HBAT. Voltage Vdd is always present in computer HC, but can vary, especially depending on the charge in battery HBAT. Voltage Vin is supplied at the output of circuit VSC through switch PWSW, which is controlled by signal ACS. Voltage Vin is therefore present at the output of circuit VCS when signal ACS is active. Port HUP receives voltage Vin supplied at the output of switch PWSW through circuit UCCT and transmits this voltage to a connection Vbs at the output of port HUP corresponding to the connection that supplies the voltage enabling an external device connected to port HUP to be supplied with power and charged if necessary. Connection Vbs is also connected to a reference voltage such as a ground through a capacitor Cb. Circuit UCCT can include a power switch (not illustrated), which is open when voltage Vin is lower than a certain threshold value, or when the current is too high, or again when controlled by a control signal PWEN, which can be emitted by one of circuits HCCT.

Circuit ATDT includes a bypass switch BPSW, a current limiting circuit CLMT, a voltage comparator CP, a logic circuit LOGC and a discharge switch ODSW. Switch BPSW receives low power supply voltage Vdd, also supplied by circuit VSC and used to supply circuit ATDT. Switch BPSW supplies voltage Vdd to current limiting circuit CLMT through a resistor Rs. The output of circuit CLMT is connected to the transmission link of voltage Vin and is linked to discharge switch ODSW through a resistor Rd. Circuit CLMT receives a control signal CLT from circuit LOGC and sends the latter a signal OCP reporting that the current threshold has been exceeded. The terminals of resistor Rs are connected respectively to the inputs of comparator CP. The output of comparator CP sends logic circuit LOGC a logic signal ADT reporting detection of a voltage drop in resistor Rs, where this voltage drop varies as a function of the current intensity passing through resistor Rs. Switches BPSW and ODSW are controlled respectively by signals BPS and DIS emitted by circuit LOGC. Circuit LOGC supplies a signal ATT reporting detection of a device connected to port HUP. Circuit ATDT can be deactivated by a signal ATen supplied at an input to circuit LOGC. This signal can be supplied by an application running on the computer and set to inactive mode especially when the battery charge is insufficient to charge the battery of an external device.

In an embodiment, circuit LOGC may be realized with a simple finite state machine with or without a memory, to store a processor-run program. Circuit DCHC can therefore be realized with only logic and analog components having a relatively low power consumption compared with a processor running a program, which may also require a power supply to a non-volatile memory where the program run by the processor is stored, and a volatile memory to store the data needed to run the program. Circuit DCHC may be a fully integrated circuit and have no need of any external components.

In an initial step of an embodiment, circuit ATDT discharges capacitor Cb in order to set initial conditions for the detection of a device connected to port HUP. Switch BPSW is then closed and the capacitors of the different powered circuits comprising those of the device connected to the HC port begin to charge. Detection of a connected device is deactivated during this charging in order to avoid including devices that might already be connected to port HUP, and to avoid indefinitely running charging cycles. At the end of a timed period, chosen with a sufficient length, the capacitors of the different powered circuits may be considered to be charged. This should result in the current supplied to port HUP dropping to a value corresponding to the leakage currents in the different powered circuits. If this does not happen, this may be considered to indicate that a device connected to port HUP is continually consuming current. In order to save battery HBAT, the current circulating in connection Vbs may be limited, for example, to a value below 1 mA, which can be set at a value between 0.6 and 0.4 mA, for example 0.5 mA. Circuit ATDT then waits for the device that is consuming current to be disconnected from port HUP. Detection can begin once port HUP is free. As a general rule, each device connected to port HUP may be allowed to draw current for a certain time corresponding to charging the capacitors in its circuits. This current triggers the switching of signal ATT to active mode.

Figure 4:
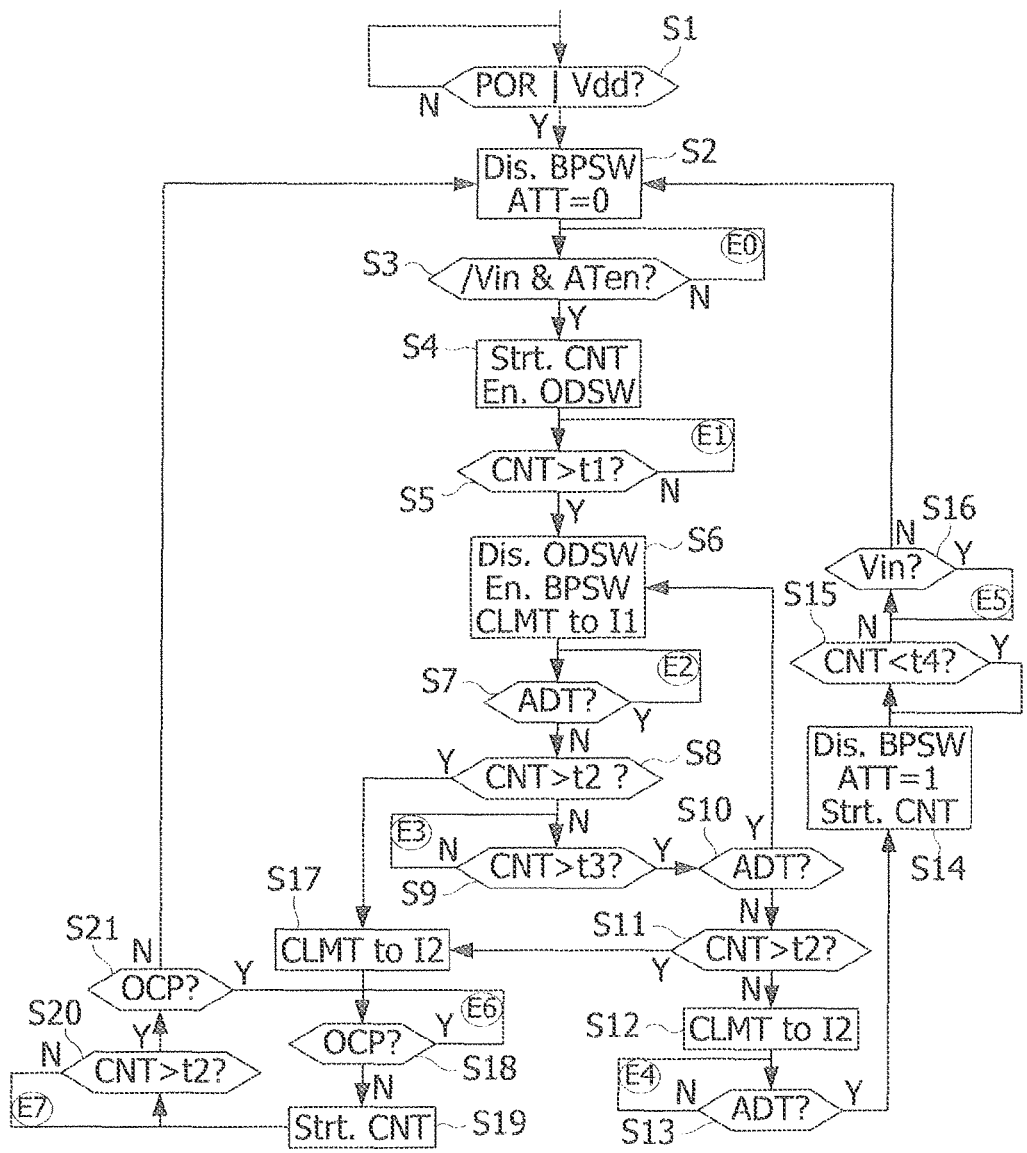
FIG. 4 shows a sequence of steps executed by the detection circuit of FIG. 3 according to an embodiment.

FIG. 4 shows a sequence of steps illustrating the functioning of circuit ATDT, and in particular that of circuit LOGC, according to an embodiment. The sequence of steps comprises steps S1 to S21. The successive performance of steps S2 to S8 is triggered by start-up initialization procedure POR for computer HC and when voltage Vdd is present (not zero), these two conditions having been tested at step S1. At step S2, switch BPSW is open and signal ATT is set to inactive mode. At step S3, circuit LOGC switches to an initial state E0 in a waiting loop for voltage Vin to become 0 or for signal ATen to switch to active mode. Steps S4 to S8 are performed successively on exiting the waiting loop. At step S4, circuit LOGC activates a counter CNT and closes switch ODSW. At step S5, circuit LOGC switches to a state E1 in a waiting loop for counter CNT to reach a first value t1, chosen with a sufficient length for capacitor Cb to discharge. Value t1 may be, for example, fixed at between 200 and 400 msec., for example at 350 msec., give or take 10%. At step S6, switch ODSW is open to stop capacitor Cb discharging. Switch BPSW is closed and circuit CLMT is controlled to limit the current passing through it to an intensity value I1, which may be, for example, fixed at between 1 and 4 mA, for example at 2.5 mA, give or take 10%. At step S7, circuit LOGC switches to state E2 in a waiting loop for capacitor Cb to finish charging following the closing of switch BPSW. Circuit LOGC uses signal ADT from comparator CP to determine when capacitor Cb is almost fully charged. In fact, when capacitor Cb is charged, the voltage drop in resistor Rs is lower than the threshold of comparator CP and the current detected by circuit CLMT is lower than current threshold I1. Signal ADT switches to inactive mode when the voltage drop in resistor Rs is lower than the voltage threshold applied by comparator CP, namely when the current intensity in resistor Rs is lower than a certain value limited to I1 by circuit CLMT. Resistor Rs is selected such that comparator CP can detect a voltage drop, which may be, for example, fixed at between 2 and 10 mV, for example at 5 mV, give or take 10%. Capacitor Cb charges typically in 550 msec. At step S8, which is performed when signal ADT switches to inactive mode, circuit LOGC tests the value of counter CNT to determine whether a time t2 has elapsed. Time t2 may, for example, be chosen at between 2 and 4 sec., for example at 3 sec. give or take 10%. If time t2 has not elapsed since counter CNT was activated (step S4), steps S9 and S10 are performed, otherwise steps S16 to S18 are performed. At step S9, circuit LOGC switches to a state E3 where it waits for the end of a time t3 since the counter was activated at step S4. Time t3 may, for example, be fixed at between t1+50 and t1+200 msec., for example at t1+100 msec, give or take 10%. At step S10, if detection signal ADT at the output of comparator CP is active, circuit LOGC restarts the sequence at step S6, otherwise it performs step S11. Steps S9 and S10 provide an indication that capacitor Cb is charged and that no device has been connected to port HUP.

At step S11, circuit LOGC tests the value of counter CNT to determine whether time t2 has elapsed. If time t2 has not elapsed, circuit LOGC performs steps S12 to S16, otherwise it performs steps S17 and S18. At step S12, circuit LOGC closes switch BPSW (previously closed at step S6) and controls circuit CLMT to limit the current passing through it to an intensity value I2, which may be, for example, fixed at between 0.2 and 1 mA, for example at 0.5 mA, give or take 10%. Limiting the current to I2 makes it possible to enhance the detection sensitivity of a device connected to port HUP. At step S13, circuit LOGC switches to a state E4 where it waits for detection signal ADT to be activated, thereupon indicating that a device has been connected to port HUP. At step S14, circuit LOGC opens switch BPSW, activates detection signal ATT at the output of circuit ATDT and restarts counter CNT. At step S15, circuit LOGC waits for the counter to reach a time t4, which may be of the order of a few seconds, for example 10 sec. At step S16, circuit LOGC switches to a state E5 where it waits for high power voltage Vin to disappear. The other circuits of circuit ATDT may be shut down to reduce power consumption. The battery of a device connected to port HUP is charged in state E5. Circuit LOGC exits this state when signal ACS switches to inactive mode, namely especially when one or other of circuits CCT and CS detects the end of charging, which triggers deactivation of signal ETS, and at the same time when the computer is powered by its battery, and push button POB has not been operated by the user. The deactivation of signal ACS triggers switch PWSW to open and hence voltage Vin to become 0 at step S16. Circuit LOGC then restarts the sequence at step S2 to return to state E0 and to detect the connection of a new device at port HUP.

At step S17, which is performed if time t2 has elapsed at step S8, circuit LOGC controls circuit CLMT to limit the current passing through it to an intensity value I2, with switch BPSW closed. At step S18, circuit LOGC switches to a state E6, in a waiting loop that runs until signal OCP is active, indicating that a device is connected to port HUP. Step S18 therefore runs until the device thereby detected is disconnected from port HUP. If signal OCP switches to inactive mode, circuit LOGC verifies that the signal remains inactive during time t2 in order to determine whether this signal switching to the inactive mode was not simply due to a temporary drop in current intensity. Circuit LOGC thus restarts counter CNT at step S19, then performs step S19. At step S20, circuit LOGC switches to a state E7, waiting for the counter value to reach time t2. When counter CNT reaches value t2, signal OCP is once again tested at step S21. If signal OCP is detected as active at step S21, circuit LOGC restarts the performance of the sequence of steps at step S18, otherwise a device is considered to have been disconnected from port HUP and the performance of the sequence of steps is continued at step S2 to detect the connection to port HUP of a device to be charged.

These procedures make it possible to charge a possible device connected to a port on the computer and to control the charging process even if the computer is switched off and in sleep mode, powered only by voltage Vdd supplied by battery HBAT. A computer in state G3 or G2-S5 as specified in the ACPI (Advanced Configuration and Power Interface) standard can therefore be used to charge the battery of a device connected to port HUP without having to restart the computer, thereby avoiding unnecessary battery consumption. In this state, the DC-DC converter in circuit HCHG may be switched off to save battery power. The detection of a possible device connected to port HUP can be achieved in a wide range of possible voltage values, for example from 1.8 V to 5 V. Moreover, the current supplied to the external device in the absence of power supply voltage Vin may be limited (by circuit ATDT), which allows battery discharging to be limited. Circuit ATDT also makes it possible to prevent computer HD from restarting more than once after connecting a device to port HUP, thereby avoiding any unnecessary discharging of the battery. This procedure also makes it possible to avoid unnecessarily discharging the battery by repeated cycles of detecting connection, charging and detecting end of charging or disconnection of the device.

The procedure illustrated in FIG. 4 can be simplified by passing directly from step S6 to step S12 to charge the battery of a device connected to port HUP as soon as such a device is detected.

Some embodiments may take the form of or comprise computer program products. For example, according to one embodiment there is provided a computer readable medium comprising a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, state machines, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   putting a computer into a sleep mode, the computer having a battery, one or more processors, a port, and charge-control circuitry;
   in response to an indication of an external device being coupled to the port, controlling, by the charge-control circuitry, supply of a charging voltage to the port during the sleep mode, the controlling including detecting an end of charging condition of the external device based on an indication of an intensity of a charging current and a counting signal;
   discharging one or more capacitors coupled to the port;
   charging the one or more capacitors;
   monitoring charging of the one or more capacitors; and
   in response to expiration of a threshold capacitor-charge time period before the monitoring indicates the one or more capacitors are charged, limiting an intensity of a current provided to the port.

2. The method according to claim 1 wherein the end of charging condition is considered detected in response to any of:
   an indication that the intensity of the charging current is lower than a first threshold value;
   an indication that an amount of electrical charge supplied to the port is higher than a second threshold value; and
   an indication that a charging period has exceeded a threshold charging period.

3. The method according to claim 1, comprising generating the indication of a device connected to the port in response to detection of a current intensity drop on a line supplying power to the port.

4. The method according to claim 1, comprising:
   waiting for the intensity of the current provided to the port to drop below a threshold value; and
   verifying that the intensity of the current provided to the port remains lower than the threshold value for a threshold verification time period.

5. The method according to claim 1, comprising powering the charge-control circuitry with a power supply voltage.

6. The method according to claim 5, comprising providing the power supply voltage to one or more circuits of the computer in a sleep mode in State G3 or G2-S5 of an Advanced Configuration and Power (ACPI) standard.

7. The method according to claim 1, comprising providing a power supply voltage to the port, wherein the charging voltage is between 4.5 V and 5.5 V and the power supply voltage is between 1.8 V and 5.5 V.

8. A device, comprising:
   an input configured to couple to a supply voltage line;
   detection circuitry configured to couple to a port and to generate a detection signal indicating an external device is coupled to the port; and
   sleep-mode charge-control circuitry configured to generate a sleep-mode charge-control signal based on an indication of an intensity of a charging current of a charging voltage line and a counting signal, wherein:
   the sleep-mode charge-control circuitry comprises:
      a comparator configured to compare the intensity of the charging current to a current threshold value corresponding to an expected intensity of a charging current at an end of a charging cycle and to generate the indication of the intensity of the charging current;
      a counter configured to generate an indication a charging time has elapsed; and
      a logic circuit configured to generate the charge-control signal based on the detection signal, the indication of the intensity of the charging current and the indication the charging time has elapsed; and
   the detection circuitry comprises:
      a finite-state machine configured to supply the detection signal;
      a bypass switch configured to couple the supply voltage line to the port;
      a discharge switch configured to control discharging of capacitors coupled to the port; and
      a current limiter inserted on a link coupling the supply voltage line to the port, wherein the state machine is configured to receive a signal representative of a voltage drop on the link coupling the supply voltage line to the port, a signal indicating a current limit of the current limiter has been exceeded, and a signal indicating a charging voltage is present.

9. The device according to claim 8 wherein the counter is configured to indicate the charging time has elapsed when a threshold charging period has elapsed or a threshold quantity of electrical charge has been supplied to the port.

10. A system, comprising:
    one or more processors;
    a port;
    power supply circuitry configured to generate a supply voltage and a charging voltage; and
    a port-charging control device configured to control charging of external devices in a system sleep mode, the port-charging control device including:
       detection circuitry configured to couple to the port and to generate a detection signal indicating an external device is coupled to the port; and
       charge-control circuitry configured to generate a charge-control signal based on an indication of an intensity of a charging current of a charging voltage line and a counting signal, wherein:
    the charge-control circuitry includes:
       a comparator configured to compare the intensity of the charging current to a current threshold value corresponding to an expected intensity of a current at an end of a charging cycle and to generate the indication of the intensity of the charging current;
       a counter configured to generate an indication a charging time has elapsed; and
       a logic circuit configured to generate the charge-control signal based on the detection signal, the indication of the intensity of the charging current and the indication the charging time has elapsed; and
    the detection circuitry includes:
       a finite-state machine configured to supply the detection signal;
       a bypass switch configured to couple a supply voltage line to the port;
       a discharge switch configured to control discharging of capacitors coupled to the port; and
       a current limiter inserted on a link coupling the supply voltage line to the port, wherein the state machine is configured to receive a signal representative of a voltage drop on the link coupling the supply voltage line to the port, a signal indicating a current limit of the current limiter has been exceeded, and a signal indicating a charging voltage is present.

11. The system of claim 10 wherein the counter is configured to indicate the charging time has elapsed when a threshold charging period has elapsed or a threshold quantity of electrical charge has been supplied to the port.

12. A system, comprising:

means for coupling to a supply voltage line;

means for generating a detection signal indicating an external device is coupled to a system port; and means for controlling charging of the external device based on an intensity of a charging current of a charging voltage line and a counting signal, wherein, the means for controlling includes:

- a comparator configured to compare the intensity of the charging current to a current threshold value corresponding to an expected intensity of a current at an end of a charging cycle and to generate an indication of the intensity of the charging current;
- a counter configured to generate an indication a charging time has elapsed; and
- a logic circuit configured to generate a charge-control signal based on the detection signal, the indication of the intensity of the charging current and the indication the charging time has elapsed;

the counter is configured to indicate the charging time has elapsed when a threshold charging period has elapsed or a threshold quantity of electrical charge has been supplied to the port; and the means for generating the detection signal includes:

- a finite-state machine configured to supply the detection signal;
- a bypass switch configured to couple the supply voltage line to the port;
- a discharge switch configured to control discharging of capacitors coupled to the port; and
- a current limiter inserted on a link coupling the supply voltage line to the port, wherein the state machine is configured to receive a signal representative of a voltage drop on the link coupling the supply voltage line to the port, a signal indicating a current limit of the current limiter has been exceeded, and a signal indicating a charging voltage is present.

13. The system of claim 12, further comprising:

one or more memories; and one or more processors.

* * * * *